(12) United States Patent
Paukkeri et al.

(10) Patent No.: US 11,531,834 B2
(45) Date of Patent: Dec. 20, 2022

(54) MODERATOR TOOL FOR MODERATING ACCEPTABLE AND UNACCEPTABLE CONTENTS AND TRAINING OF MODERATOR MODEL

(71) Applicant: UTOPIA ANALYTICS OY, Helsinki (FI)

(72) Inventors: Mari-Sanna Paukkeri, Helsinki (FI); Tom Packalén, Helsinki (FI)

(73) Assignee: UTOPIA ANALYTIC OY, Helsinki (FI)

( * ) Notice: Subject to any disclaimer, the term of this patent is extended or adjusted under 35 U.S.C. 154(b) by 57 days.

(21) Appl. No.: 16/137,723

(22) Filed: Sep. 21, 2018

(65) Prior Publication Data

US 2019/0026601 A1    Jan. 24, 2019

Related U.S. Application Data

(63) Continuation of application No. PCT/FI2017/050194, filed on Mar. 21, 2017.

(30) Foreign Application Priority Data

Mar. 22, 2016   (FI) ..................................... 20165240

(51) Int. Cl.
*G06F 40/35*      (2020.01)
*G06F 40/263*     (2020.01)
(Continued)

(52) U.S. Cl.
CPC ......... *G06K 9/6256* (2013.01); *G06F 16/353* (2019.01); *G06F 16/9535* (2019.01);
(Continued)

(58) Field of Classification Search
CPC .... G06F 40/279; G06F 40/284; G06F 40/289; G06F 40/30; G06F 40/35; G06F 40/253; G06N 20/00
(Continued)

(56) References Cited

U.S. PATENT DOCUMENTS 6,161,130 A     12/2000   Horvitz et al.
7,769,759 B1 *  8/2010    Gartung ................ G06F 16/353
                                                     707/737
(Continued)

FOREIGN PATENT DOCUMENTS

WO    WO 2013/052555     *  4/2013    ............... G06K 9/62
WO    WO-2013/052555 A1    4/2013
WO    WO-2015/103695 A1    7/2015

OTHER PUBLICATIONS

Nemanja Djuric et al: "Hate Speech Detection with Comment Embeddings", Proceedings of the 24th International Conference on World Wide Web, WWW '15 Companion. Florence, Italy May 18, 2015 (May 18, 2015), pp. 29-30, XP055379282, New York, New York, USA DOI: 10.1145/2740908.2742760 ISBN: 978-1-4503-3473-0 abstract sections 1-3.
(Continued)

*Primary Examiner* — Martin Lerner
(74) *Attorney, Agent, or Firm* — Robert P. Michal, Esq.; Carter, DeLuca & Farrell LLP

(57) ABSTRACT

A computer-executable method for moderating publication of data content with a moderator tool. The data contents are labelled as acceptable or unacceptable. The moderator tool receives the training data and executes a first algorithm that identifies features that exist in the training data and extracts them and ending up with a feature space. The moderator tool executes a second algorithm in the feature space for defining a distribution of data features that differentiate between the acceptable contents and the unacceptable contents in order
(Continued)

Figure 1:
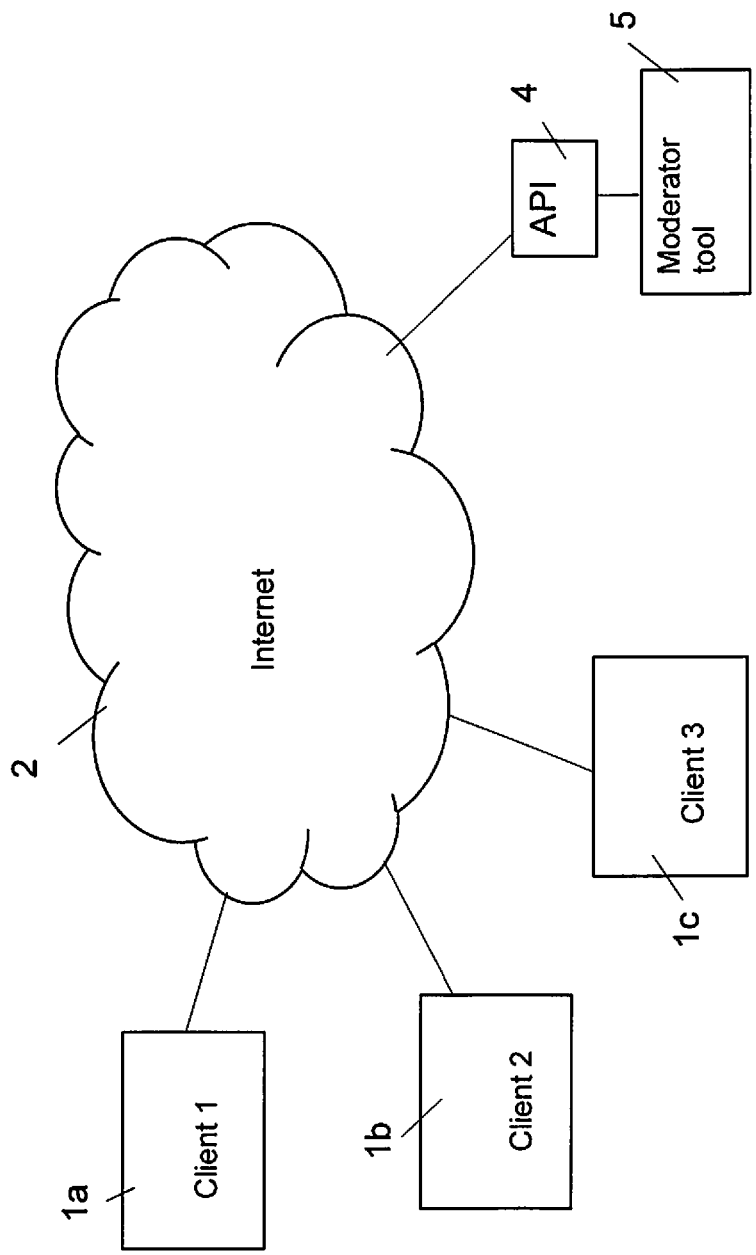

to create a moderation model. When the moderator tool receives a new data content to be moderated, it executes the moderator tool on the new data content for identifying the data features in the new data content to be moderated in accordance with the moderation model created, and for producing a moderation result for the new data content by indicating whether the new data content is acceptable.

27 Claims, 2 Drawing Sheets

(51) Int. Cl.
*G06N 20/00* (2019.01)
*H04L 51/21* (2022.01)
*G06K 9/62* (2022.01)
*G06F 16/35* (2019.01)
*G06F 40/30* (2020.01)
*H04L 51/212* (2022.01)
*G06F 16/9535* (2019.01)

(52) U.S. Cl.
CPC .......... *G06F 40/30* (2020.01); *G06K 9/6253* (2013.01); *G06N 20/00* (2019.01); *H04L 51/212* (2022.05)

(58) Field of Classification Search
USPC .................. 704/1, 9, 10; 706/20, 55, 12, 25
See application file for complete search history.

(56) References Cited

U.S. PATENT DOCUMENTS

| | | | | |
|---|---|---|---|---|
| 8,112,484 | B1* | 2/2012 | Sharma | H04L 51/12 |
| | | | | 726/13 |
| 9,916,309 | B2* | 3/2018 | Mani | G06N 20/00 |
| 2005/0228783 | A1* | 10/2005 | Shanahan | G06F 16/3347 |
| | | | | 707/E17.08 |
| 2009/0150308 | A1* | 6/2009 | Wang | G06V 30/268 |
| | | | | 706/12 |
| 2011/0040837 | A1* | 2/2011 | Eden | G06F 40/40 |
| | | | | 709/206 |
| 2011/0078187 | A1* | 3/2011 | Lim | G06F 16/285 |
| | | | | 707/772 |
| 2011/0078242 | A1* | 3/2011 | Davi | G06F 16/958 |
| | | | | 709/204 |
| 2011/0289432 | A1* | 11/2011 | Lucas | G06F 16/958 |
| | | | | 706/47 |
| 2012/0303558 | A1* | 11/2012 | Jaiswal | G06N 20/00 |
| | | | | 706/12 |
| 2013/0024183 | A1* | 1/2013 | Cardie | G06F 16/345 |
| | | | | 704/8 |
| 2013/0124439 | A1* | 5/2013 | Yamamoto | G06F 40/295 |
| | | | | 706/12 |
| 2013/0138428 | A1 | 5/2013 | Chandramouli et al. | |
| 2014/0200878 | A1* | 7/2014 | Mylonakis | G06F 40/51 |
| | | | | 704/4 |
| 2014/0278346 | A1* | 9/2014 | Zomet | G06F 40/58 |
| | | | | 704/3 |
| 2014/0279738 | A1* | 9/2014 | Mahler | G06F 40/126 |
| | | | | 706/12 |
| 2014/0330552 | A1* | 11/2014 | Bangalore | G06F 40/44 |
| | | | | 704/4 |
| 2015/0154289 | A1 | 6/2015 | Revesz et al. | |
| 2015/0163184 | A1* | 6/2015 | Kanter | G06Q 50/01 |
| | | | | 709/204 |
| 2015/0254228 | A1* | 9/2015 | Miura | G06F 40/40 |
| | | | | 704/8 |
| 2015/0310352 | A1* | 10/2015 | Kyaw | G06F 40/30 |
| | | | | 706/12 |
| 2015/0317562 | A1* | 11/2015 | Srinivasan | G06N 20/00 |
| | | | | 706/46 |
| 2016/0065605 | A1* | 3/2016 | Yan | G06N 20/00 |
| | | | | 726/23 |
| 2016/0117589 | A1* | 4/2016 | Scholtes | G06N 20/00 |
| | | | | 706/12 |
| 2016/0275946 | A1* | 9/2016 | Caseiro | G06F 40/216 |
| 2016/0335674 | A1* | 11/2016 | Plourde | G06F 16/353 |
| 2017/0142044 | A1* | 5/2017 | Ball | H04L 51/212 |
| 2017/0257329 | A1* | 9/2017 | Tetreault | G06F 40/253 |

OTHER PUBLICATIONS

Adam Maus: "SVM Approach to Forum and Comment Moderation", Class Projects (CS), University of Wisconsin, Jan. 1, 2009 (Jan. 1, 2009), XP055211566, Retrieved from the Internet: URL:http://pages.cs.wisc.edu/~jerryzhu/cs769/project/2009/adam_maus.pdf [retrieved on Sep. 7, 2015] abstract p. 1-p. 2.

Finnish Search Report issued by the Finnish Patent and Registration Office in relation to Finnish Application No. 20165240 dated Oct. 28, 2016 (2 pages).

International Search Report issued by the European Patent Office acting as the International Searching Authority in relation to International Application No. PCT/FI2017/050194 dated Jun. 21, 2017 (5 pages).

Written Opinion of the International Search Authority issued by the European Patent Office acting as the International Searching Authority in relation to International Application No. PCT/FI2017/050194 dated Jun. 21, 2017 (6 pages).

Communication pursuant to Article 94(3) EPC issued in corresponding application EP 17 717 770.6 dated Feb. 28, 2022 (9 pages).

* cited by examiner

MODERATOR TOOL FOR MODERATING ACCEPTABLE AND UNACCEPTABLE CONTENTS AND TRAINING OF MODERATOR MODEL

CROSS-REFERENCE TO RELATED APPLICATIONS

This application is a continuation of PCT International Patent Application No. PCT/FI2017/050194 filed Mar. 21, 2017, which claims the benefit of Finnish Patent Application No. 20165240, filed Mar. 22, 2016, the disclosure of each of these applications are expressly incorporated herein by reference in their entireties.

TECHNICAL FIELD

The invention is concerned with a computer-executable method for moderating data contents. The invention is also concerned with a system for such moderation and a moderator tool to be used therein.

BACKGROUND

User-generated content is defined as any form of content in a natural language, (either an official language, a dialect or slang) such as blogs, newspaper platforms, discussion forums, newsgroups, posts, chats, messages, e-mails, tweets, podcasts, advertisements as well as other forms of media that is created by users of a system or service, often made available via social media or other websites in public or for a restricted group of people.

Many types of e.g. Internet websites allow for publication of such user-generated content of the above kind. User-generated content may be monitored by website administrators to avoid offensive content or language, copyright infringement issues, or simply to determine if the content posted is relevant to the general theme of the site or discussion.

Especially, the ability for services to accept user-generated content opens up a number of legal concerns depending on local laws. The operator of a service may be liable for the actions of its users even if a site, generally speaking, is not liable for user generated content. Recognized exceptions to immunity from liability for user generated content include posts infringing on intellectual property rights, criminal offenses and posts where the site participates in or makes the inflammatory post.

Moderation is a process for eliminating or lessening extremes. It is used to ensure acceptability throughout the medium on which it is being conducted. The term moderation is used generally for generating an indication of or guiding whether the content analyzed is unacceptable.

A moderator may remove unsuitable contributions, e.g. remove it completely or reduce the excessiveness of a content, from a website, forum or chat channel they represent in accordance with their moderation system in order to make it less violent, severe, intense, rigorous, obscene, illegal, or insulting with regards to useful or informative contributions.

An administrator of an Internet website might use moderation for user comments. Depending on the site's content and intended audience, the administrator will decide what kinds of user comments are appropriate, then delegate the responsibility of sifting through comments to lesser moderators. Most often, administrators will attempt to eliminate trolling, spamming, or flaming, although this varies widely from site to site.

Common privileges of moderators include e.g. deleting, moving, and splitting of posts and threads, banning, suspending, unsuspending, and unbanning.

Essentially, it is the duty of the moderator to manage the day-to-day affairs of a forum or board as it applies to the stream of user contributions and interactions. The relative effectiveness of this user management directly impacts the quality of a forum in general, its appeal, and its usefulness as a community of interrelated users.

Conventional moderation systems use human moderation. Such systems, however, tend to be time-consuming and are not always very reliable either.

Therefore, automatic moderation systems have been developed.

Spam filters for messages, such as e-mails and social media discussions, exist. Spam filters intend to remove disturbing advertising and automatically created messages and content (e.g. program code) but they do not understand semantic contents of the text. Spam filters generally use stop word lists and specific manually generated rules which are applied to the messages and specific meta fields. They can even use machine learning but is only able to locate specific kinds of spam, not for example improper or illegal comments.

There are also various natural language processing systems and language-specific systems for general text classification.

US patent application 2012/0271627 describes methods for classification of text documents written in different languages by constructing different semantic structures before the classifying of the documents. The structures reflect lexical, morphological, syntactic, and semantic properties of documents. The methods are applicable to e.g. topic detection and news analysis.

US patent application 2005/0027664 discloses an interactive machine learning based system that learns to annotate new text data on the basis of training data.

U.S. Pat. No. 9,177,333 discloses a solution for evaluating the quality of text within online advertisements by using output from a language model. The output maybe used with a machine learning algorithm to generate a quality score that can be used to filter out advertisements with poor text quality. In addition to the input in the form of text to be evaluated, training data for ranking various defects can be used as input.

Some systems can categorize a content to be published and determine whether it is suitable for publication.

WO publication 2012/162044 discloses a solution that is applied to moderating conversations in the internet or other messaging systems. It presents a system for categorizing and moderation of user-generated content in an on-line environment. This solution processes a text to be published by using a machine-learning algorithm to calculate a likelihood that the text falls into a category unsuitable for publication. A comparison between the likelihood and some threshold values is used as a basis for determining whether the text should be excluded from publication.

There is, however, a need for more accurate moderation methods for using more widely for different kinds of contents, needs and environments.

SUMMARY

The computer-executable method of the invention for moderating publication of data content by means of a moderator tool comprises providing a set of data contents to be used as training data. The data contents are labelled as acceptable or unacceptable contents. The moderator tool receives said training data and executes a first algorithm that identifies features that exist in the training data and extracts them, and ending up with a feature space. The moderator tool executes a second algorithm in the feature space for defining a distribution of data features that differentiate between the acceptable contents and the unacceptable contents in order to create a moderation model. When the moderator tool receives a new data content to be moderated, it executes the moderator tool on the new data content for identifying the data features in the new data content to be moderated in accordance with the moderation model created, and for producing a moderation result for the new data content by indicating whether the new data content is acceptable or unacceptable.

The moderation system of the invention for moderating data contents by a computer-executable method comprises a moderator tool executing algorithms for
- identifying features that exist in training data provided in the form of a set of data contents labelled as acceptable and unacceptable contents and for extracting them, and ending up with a feature space,
- creating a moderation model by determining a distribution of data features that differentiate between the acceptable contents and the unacceptable contents,
- moderation of data contents received from a client device by means of said moderation model, and
- producing a moderation result for the data contents by indicating whether the new data content is acceptable or unacceptable.

The system also comprises one or more client devices with means for sending training data and data contents to the moderator tool to be moderated, and an interface for interaction between the one or more client devices and the moderator tool.

The computer-executable tool for moderating data contents has computer executable instructions in the form of one or more algorithms for analyzing training data comprising a set of data contents labeled to be acceptable or unacceptable contents, identifying features that exist in the training data and extracting them, and ending up with a feature space, determining a distribution of data features that differentiate between the acceptable contents and the unacceptable contents in order to create a moderation model, using the moderation model for moderation of data contents by identifying data features in the data content, and for producing a moderation result of the data content.

The preferable embodiments of the invention have the characteristics of the subclaims.

It is emphasized that said moderation model is specific for a given training data, whereby the moderator tool has means to serve each client device individually by using a specific moderation model created for a given client.

The features consists of one or more of characters, character strings, character parts, words, text items, parts of words, word combinations, n-grams, parts of n-grams, phrases, sentences, paragraphs, modifications of words, word part combinations, full documents, values, labels, classifications, combinations of these, and other signifiers or features. This information can include author names, dates of the contents, stamps, titles, addresses, etc. The features may also include mathematical features, like sums, means, and distribution parameters.

Additional training data can be used and sent from clients for updating the moderation tool and the moderator tool can check the functioning of the updated moderation model to ensure that it works better than the foregoing moderation model for a test material set separated from the new training data.

Especially, the second algorithm, which is a machine-learning algorithm, analyzes the difference between the feature sets for finding features that differ one of the sets from another and are referred to the meaning of the language in the texts of the training sets and how the human expressions in the texts are understood.

The moderator tool differentiates the acceptable contents and the unacceptable contents by defining a boundary that optimally separates the acceptable and unacceptable contents. The second algorithm can choose the feature distribution to be used in the moderation model.

In this way it is able to notice improper language use, illegal or offensive comments, off-topic comments, improper topics, insults, cursing, complaining, aggressiveness and repetition, and make a distinction between them and accepted language use.

The training data is in a data format with separate fields for different type of data content and labeling.

The moderator tool is a computer program supporting the method of the invention by executing a machine-learning algorithm or a set of algorithms designed to be used in conjunction with computer hardware (and possibly other programs) and to solve the problem of finding unacceptable features in texts. It can be a discrete program, executed separately e.g. from a command line—or may be part of a larger program.

The method of the invention can be divided in two parts, i.e. a training part and the new data moderation part.

The training part of the method consists of data manipulation and machine learning. The data manipulation consists of said feature extraction.

In the first part, i.e. the training part, suitable data for training the machine-learning algorithm is collected from the client for the type of data to be moderated. The data can be messages, textual comments, discussions, articles, or any text together with other kind of data, such as metadata, images, videos, animations, games, speech, music, sounds, sensor data and any other natural or technical data, which have been moderated into a group of accepted contents and a group of improper and unaccepted data.

In the second part, i.e. the machine-learning part, the training data is exposed to the machine learning algorithm which is able to treat the texts constituting the training data as sets of features and learn from the sets which features occur in the accepted text and which occur in the improper text.

Furthermore, additional algorithms can be used for creating the moderation model, which can further split the set of improper texts into subsets of reasons of being improper.

The algorithm(s) used in the invention create moderation models for specific data they have been trained for. That specific data comprises for each case or each user the training sets of acceptable and unacceptable and improper example texts. The moderation model is therefore specific for each client.

Each specific moderator model comprises a set of rules to moderate a new text content. In practice, different clients have their own moderation models in accordance with what kinds of texts they have defined as being acceptable and what kinds of texts they have defined as being unacceptable and the boundary is set up in accordance with these definitions.

Still further algorithms can be used in the model, which calculate statistics and other measures of the results of analysis of a texts, wherein a specific model has been used. Such results can be presented for a client who gets detailed information of how the model has moderated his texts.

After the moderation model has been created, it can be used to moderate a data content. For this purpose, a data content, such as a text content, together with possible meta information is given as input to the moderator tool and the moderation result is presented optionally together with possible more detailed information about the moderated text content. The detailed information might e.g. consist in reasons of the end result, e.g. what features have made an analyzed text improper.

The moderator tool of the invention can be directly used to hide unacceptable data contents and publish data contents moderated by it.

Optionally, the moderator tool can be used together with manual verification and/or moderation.

The moderation result of the data content produced is sent to the client device, optionally together with a confidence value revealing how certain the moderator tool is about the moderation result.

When using manual moderation together with the automatic moderator tool, the moderation results can be verified with human effort and at the same time, new training data can be collected for retraining the algorithm of the moderator tool.

The moderator tool can be implemented as a web service on a server with an interface there between that communicates with users, clients and customers of the service and the moderator tool. The moderator tool can moderate all kinds of textual contents sent thereto.

The moderator tool may work as a standalone tool on a server of a newspaper site or discussion forum or other messaging board. It may also be located at a separate moderation server which is accessed through technical interfaces over a data network.

The moderator tool can also be implemented as an application or app on a client device, such as on a desktop, computer unit, mobile device, a laptop, ipad, smart phone or the like, in which case it can moderate text messages, e-mails an all kinds of textual contents stored or sent thereto.

In addition to network sites, the invention can be applied on any texts, e-mails, text messages of e.g. the Short Message Service (SMS), WhatsApp messages, chat services, game discussions and sites requiring registration or login and on messages in internal networks.

The invention can be used by Internet service providers or other website holders for controlling publication of user-generated content. The invention can also be used in various other types of Internet sites that permit user comments, such as: Internet forums, blogs, and news sites, instant and discussion messaging, blogs, newspaper discussions and other discussion fora, newsgroups, posts, chats, messages, e-mails, tweets, podcasts and other text and forms of media in any natural language (either official, dialect or slang), which is supposed to be published in public or for a restricted group of people.

Thus, the invention can by means of machine learning methods be used to learn the moderation style of these different types of user comments. Due to the machine learning approach, the tool is able to moderate messages according to specific conventions and rules of the forum at hand.

A general version of the moderator tool trained with one general data set can be used in many sites.

The moderation technology of the invention works for any natural language by performing data moderation on text contents. Especially, it is mentioned that the invention works for languages that blend words, like Finnish, and for languages without spaces between the words, like Chinese and Japanese. The language-independent technology can be made even more accurate by adding language-specific components when applied on one or more specific languages.

The moderator tool of the invention can also be trained to perform well for several languages at the same time.

In the following, the invention is described by means of some example embodiments by referring to figures. The invention is not restricted to the details of these embodiments.

FIGURES

Figure 2:
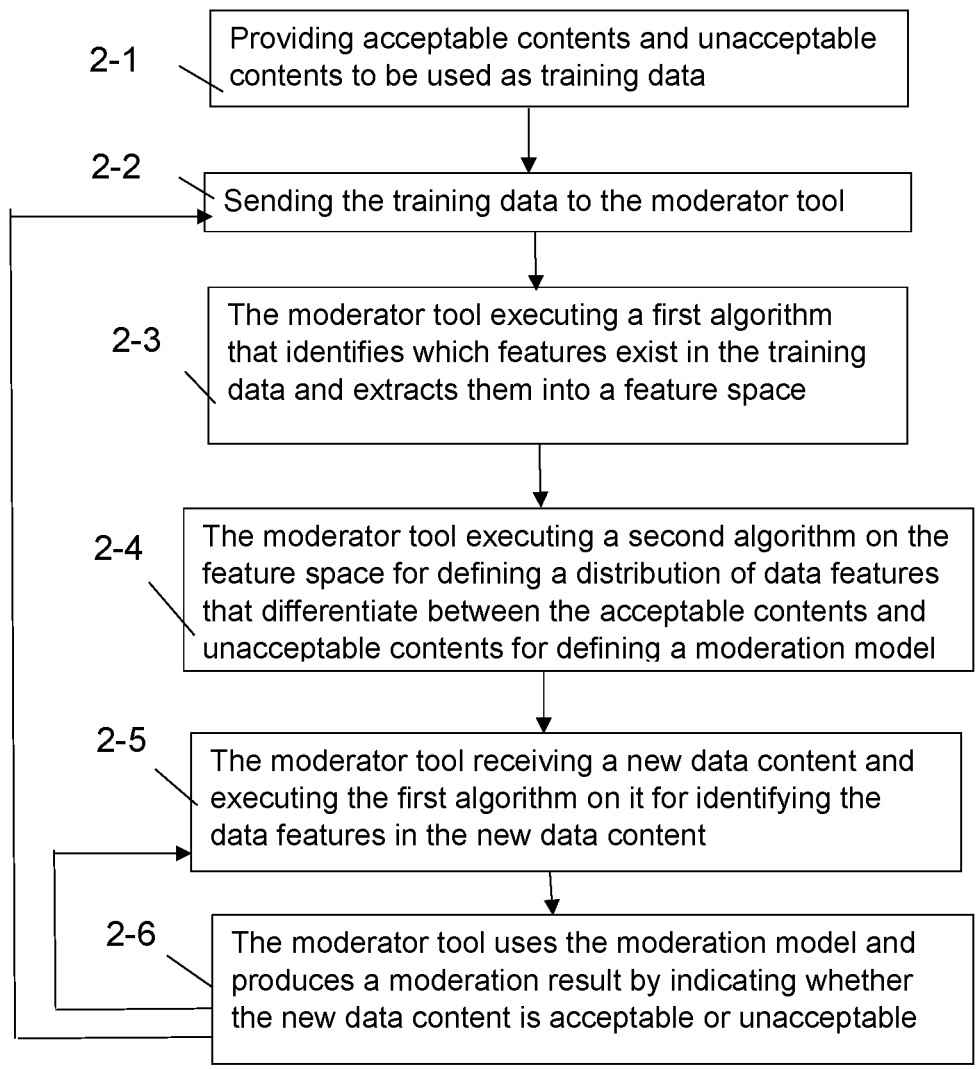

FIG. 1 is a general block diagram of the components participating in the system of the invention FIG. 2 is flow scheme of an embodiment of the method of the invention

DETAILED DESCRIPTION

FIG. 1 is a general block diagram of the components participating in the system of the invention.

It is assumed that a moderator service working as a moderator tool 5 is available through the Internet 2 via an interface 4 for a number of client devices 1a, 1b, 1c of which three is illustrated in FIG. 1.

The moderator tool and the interface can be on different servers.

The client devices 1a, 1b, 1c each provides their own training data for the moderator tool 5.

The training data is sent to the moderator tool 5 for training the machine-learning algorithms and comprises, in addition to the content itself to be analysed, the information whether the content is acceptable or unacceptable.

The moderator tool 5 executes a machine learning algorithm that creates a moderation model for how to perform moderation of data and that moderates the data in accordance with the moderation model.

The interface 4 interacts between the moderator tool 5 and the client devices 1a, 1b, 1c by communicating with them.

User-generated content, such as blogs, newspaper discussions and other discussion fora, newsgroups, posts, chats, messages, e-mails, tweets, podcasts and other text and forms of media, which is supposed to be published in public or for a restricted group of people is sent by the client devices 1a, 1b, 1c to the moderator tool 5. Published user-generated content is separately administrated by webmasters of each client. Depending on the type of content and intended audience of each client, the webmaster of each client decides what kinds of user content and comments are appropriate. Moderation is performed in order to ensure that the contents to be published are acceptable in accordance with a publishing policy of each webmaster or other person with the responsibility for the contents to be published. Most often, the webmasters will attempt to eliminate improper content, trolling, spamming, or flaming, although this varies widely from site to site. A moderator may e.g. remove unsuitable contributions, e.g. reduce the excessiveness of a content in order to make less violent, severe, intense, or rigorous. Contributions that are irrelevant, obscene, illegal, or insulting with regards to useful or informative contributions might also be removed.

Each client, however, has its own type of contents, with respect to style, theme, subject and acceptable features to be published.

A client in the moderation system of the invention intending to use the moderator tool 5 therein therefore should provide training data in order to tell how its contents should be moderated. For this purpose, training data is usually readily available and is for example based on human-generated moderations on earlier user-generated data by a client. Thus, the training data used in the invention consists of data that is based on real examples of client contents. Another advantage with using such real data as training data is the possibility for using a big amount of data as training data if the client has a history of having published and moderated a high number of contents earlier, which makes the training even more efficient.

The quality of the training data has an influence on the learning result, because if similar texts have ended up into both accepted and unaccepted groups, the moderator tool 5, of the invention will not recognize the semantic relations in the contents and learn the difference between acceptable and unacceptable contents between them.

The training is preferably performed on data that contains the full text to be moderated and a label stating whether the text is acceptable or unacceptable.

The training data is exposed to a machine learning algorithm executed by the moderator tool 5.

Different kinds of machine learning algorithms can be used for the task, such as clustering, classification, neural networks, deep learning and algorithms utilizing distance measures between natural data.

In the field of computational linguistics, an n-gram is a contiguous sequence of n items from a given sequence of text. The items can be characters, character parts, syllables, words, stems, lemmas, or transformations of these to the application. The n-grams typically are collected from a text or speech corpus. For example a character 3-gram from "good morning" can be "goo", "ood", "od", "d m", "mo", "mor" and so forth.

The training data sent to the moderator tool 5 to be processed by the algorithm is in a format with fields for text content and metadata.

Additional data, so called metadata, can be included in the training data. For example, author names, dates, IP-addresses, images, videos, animations, games, speech, music, sounds, sensor data, and any other natural or technical data, etc. can be used as additional information for indicating what is acceptable in different situations or generally.

In the feature extraction, any text or metadata can be further divided into additional features such as, the original date and time, the date alone, the month alone, the year alone, the week number, the year and week number, weekday, hour alone, time alone, part of day classification (morning, daytime, evening, night). This might be done in cases, wherein such processing is worth doing.

Other metadata to be used as features might be the user name, the Internet Protocol (IP) address of the user, the user's log in information etc.

In some embodiments, some features might be formed into new kinds of features, like combination features.

The way of the invention to extract and select features is very advantageous since it makes the invention language-independent. Useful preprocessing for supporting language-independency is especially a function of splitting adjacent characters into words, which is needed for texts in e.g. Chinese and Japanese, cutting compound words into parts, splitting inflected words into a stem and an ending.

In addition, frequency counts are performed in order to remove too frequent and too rare text items, also semantically important text items are emphasized by using measures including but not restricted to tf.idf, entropy etc. Document vectors can be normalized and external, mostly language-independent, data sources and tools can be used for further processing, such as language detection, smiley/emoticon recognition, stemming, web link handling, date handling, date and time handling, word embedding etc.

Preferably, as much training data as possible is given to be processed by the algorithm—in some case even more than needed since the algorithm can choose the features to be used in the moderation model that gives the best result.

One way to choose some of the parametrizations of the model is to use a small development data set, split randomly from the training set. The training step can be implemented as a kind of an iterative process, involving selection of features and testing a range of parametrizations using the development set. The parameter optimisation can be done either manually or automatically. The feature set can be further expanded or existing features replaced with new features. This requires more detailed processing and memory usage but gives better performance in explaining the acceptability and unacceptability policy of the specific client. A very large number of features can be given for the moderation algorithm, which decides the final feature distributions and model parametrizations to be used in the moderation model for the client.

In the creation of the moderation model, the moderation algorithm selects the features to be used in the final moderation model, by making use of the information associated with acceptable and unacceptable contents received. The algorithm also decides on the basis of the acceptable and unacceptable contents received which features and combination of features are more important than others and how much features and/or combinations of those should be weighted.

A moderation model is obtained as the final result of the training of the algorithm, which contain the information of the final selection of the features, the combination of those and the parameters learnt by the algorithm for each of the training data sets.

Still further, the moderator tool can constantly be trained with new training data for updating the moderation model. The system comprises a function with which the client can send additional training data from the client device for the updating.

The new training data is obtained for three main reasons: first to get more good-quality training data to build a more detailed moderator model, second, to learn the new topics occurring in the conversations and messages, and third, to update the possible changes in the moderation policy of the client.

Thus, the training data is sent from a client device 1a, 1b or 1c to the interface 4 and the client device 1a, 1b or 1c can get a confirmation message that the new training data has been taken into consideration in the moderation model, which has been retrained to be used for moderating the text contents of the client in the future. There is also a function with which the moderator tool checks the functioning of the updated moderation model to ensure that it works better than the foregoing moderation model for a test material set separated from the new training data.

To run the training process, the original data (sets) are divided to comprise at least a training material set (typically ca 80%) and a test material set (typically ca 20%). Typically, the training set and the test set are randomly divided into two parts so that there is a similar distribution of the same kind of data in both sets. Another option is to take the most recent messages on the test set. In some embodiments and/or depending on algorithm used, the original data is divided into a training set, a test set, and additionally a development set, the last mentioned to constitute e.g. ca 10% of the training data (as divided from the training set that in this case constitutes 70%).

The algorithm may be executed several times before a suitable parametrization has been found. Thus, the parameters are adjusted with a development set, and the testing and a measurement of the performance of the algorithm is made with a separate test data set.

An additional function in the moderator tool 5 is that when the tool 5 sends the result of the moderation back to the client device 1a, 1b, or 1c, there might be a confidence value which reveals the information how certain the moderator tool 5 was about the moderator result or a review flag in case the moderator tool 5 considers the result to be uncertain. The decision of attaching such a review flag might made by a manually or automatically defined threshold.

The client can choose the strictness of each content's moderation. A strictness value can be applied on the moderation. A stricter moderation is more absolute and a lenient might let borderline cases pass. A review flag can also be used in these cases.

The moderator tool can be implemented as a web service on the Internet with an interface that communicates with client devices requesting and using the service. Alternatively, the moderator tool can be implemented as an app on a client device or it is implemented as a standalone tool on a server or a computing device.

The moderator tool can be located on a separate moderation server accessed through a technical interface 4.

The moderator tool 5 receives the training data and the text data contents and metadata to be moderated from the client devices 1a, 1b, 1c via the interface 4.

The interface 4 through which the interaction between the service and the client takes place might be an Application Programming Interface (API), e.g. a web API. In this context, API is typically defined as a set of Hypertext Transfer Protocol (HTTP) request messages, along with a definition of the structure of response messages, which can be for example in a JavaScript Object Notation (JSON) format.

FIG. 2 is a flow scheme of an embodiment of the method of the invention to be implemented in a system of FIG. 1.

This example illustrates the method when the tool interacts with only one client and the use of one moderation model but naturally, the tool can have several moderation models trained for moderation of data contents from several clients or it can even have several moderation models for the same client to be used depending on situation or there can be one model for several clients.

It is therefore now assumed that the moderator tool of the invention is prepared to be used by a given client. The moderator tool needs training data so that the machine-learning algorithm used would know how to moderate contents of this given client.

For that purpose, the client collects in step 2-1, a set of contents to be used as training data by labelling them as acceptable data contents or unacceptable contents. The client might have such existing acceptable data contents or unacceptable data contents to be used for the training. Alternatively, acceptable data contents or unacceptable data contents can be made manually, e.g. by domain experts, who define the moderation policy of the forum of this client, wherein the text content are supposed to be published. In this example, the data contents are supposed to consist of textual contents and metadata.

In step 2-2, the training data is sent from a device of the client, via an interface, to the moderator tool having a moderation service that uses the moderator tool of the invention.

In step 2-3, the moderator tool executes a first algorithm that identifies which features exist in the training data and extracts them into feature spaces, such as into lists.

In step 2-4, the moderator tool executes a second algorithm on said lists of features for defining a distribution of data features that differentiate between the acceptable contents and the unacceptable contents in order to create a moderation model. The moderator tool differentiates the acceptable contents and the unacceptable contents by placing the labeled acceptable contents and the unacceptable contents on separate sides of a boundary.

The machine-learning algorithm is now trained and in the moderator tool can be used to moderate new contents to be published by executing the created moderation model.

In step 2-5, the moderator tool receives a new data content with text and metadata to be moderated and executes the first algorithm on the new data content for identifying the data features in the new data content to be moderated in accordance with the moderation model created.

In step 2-6, the moderator tool uses the moderation model and produces a moderation result for the new data content by indicating whether the new data content is acceptable or unacceptable by determining on which side of the boundary the new content is in the feature space.

In unsure cases, the moderator tool might tag the result with a flag. In such cases, the moderated data content might be close to the boundary for what has been determined as be acceptable and what has been determined unacceptable.

The client can continue to use the service and send new data contents to be moderated by the moderator tool. This is indicted by an arrow to step 2-5 from step 2-6. If desired, the client might send new training data to the moderator tool in order to improve the moderation model. This is indicted by an arrow to step 2-2 from step 2-6.

The invention claimed is:

1. A computer-executable method for moderating publication of data content by a moderator tool, the method comprising:
   a) providing a set of data contents as training data, the data contents being labelled as acceptable or unacceptable contents,
   b) the moderator tool receiving said training data,
   c) the moderator tool executing a first algorithm that identifies features that exist in the training data and extracts them, and ending up with a feature space,
   d) the moderator tool executing a second algorithm in the feature space for:
      choosing the features to be used in a moderation model to be created and defining a weighting of data features, the choosing and defining based on the data contents labelled as the acceptable contents and the unacceptable contents, and
      training parameters of a machine learning model based on the weighted data features in order to create the moderation model,
   e) the moderator tool receiving a new data content to be moderated,
   f) the moderator tool executing the first algorithm on the new data content for identifying the data features in the new data content to be moderated in accordance with the moderation model created, and g) producing a moderating result for the new data content by indicating whether the new data content is acceptable or unacceptable in accordance with the moderation model created, wherein the moderator tool performs language detection.

2. The method of claim 1, wherein the features consists of one or more of: characters, character strings, character parts, words, text items, parts of words, word combinations, n-grams, parts of n-grams, phrases, sentences, paragraphs, word part combinations, full documents, values, labels, classifications, mathematical features, sums, means, distribution parameters, or combinations of these.

3. The method of claim 1, wherein the data content comprises different types of data including at least one of text or metadata.

4. The method of claim 1, wherein receiving said training data in step b) in a data format with separate fields for different type of data content and labeling.

5. The method of claim 1, further comprising using both text data and metadata for the moderation and for creating the moderation model.

6. The method of claim 5, further comprising processing content data for defining additional features.

7. The method of claim 1, wherein choosing the features to be used in the moderation model includes at least one of:
not selecting text items which are too frequent,
not selecting text items which are too rare,
weighting text items,
normalizing document vectors, or
further processing including at least one of: language detection, emoticon recognition, stemming, web link handling, date handling, date and time handling, or word embedding.

8. The method of claim 7, wherein weighting text items includes weighting text items based on at least one of term frequency-inverse document frequency (tf.idf) or entropy.

9. The method of claim 1, wherein training the second algorithm by splitting the data set of training data in a train set, test set and a development set, the train set being used for defining the features and creating the moderation model, the test set being used for measuring the model performance, and the development set is used for defining some parameters for the model.

10. The method of claim 1, further comprising sending additional training data to be used for updating the moderation model.

11. The method of claim 1, wherein language-specific processing is used in the moderation model.

12. The method of claim 1, wherein the moderator tool being implemented as a web service on the Internet with an interface that communicates with client devices requesting and using the service.

13. The method of claim 1, wherein the method further utilizes client devices for performing steps a) and b) for providing the training data, and sending them to the moderator tool when requesting and/or using the service.

14. The method of claim 1, wherein the moderator tool is implemented as an application on a client device.

15. The method of claim 1, wherein the moderator tool is implemented as a standalone tool on a server or a computing device.

16. The method of claim 1, wherein the moderator tool being located on a separate moderation server accessed through a technical interface.

17. The method of claim 1, wherein the interface through which the interaction between the moderator tool and a client device takes place is an Application Programming Interface, API.

18. The method of claim 1, wherein the data contents to be moderated are user-generated content including at least one of: blogs, newspaper discussions, discussion fora, newsgroups, posts, chats, messages, comments, e-mails, tweets, podcasts, or media metadata, which is supposed to be published in public or presented for a restricted group of people.

19. The method of claim 1, wherein training data is based on human-generated moderated data, which is one of: earlier published by a client or not earlier published by a client.

20. The method of claim 1, wherein the moderator tool checks the performance of the updated moderation model to ensure that it works better than the foregoing moderation model for a test set separated from the additional training data.

21. The method of claim 1, wherein the moderator tool communicates with a client device and the moderation result of the data content produced in step g) is sent to the client device, together with a confidence value revealing how certain the moderator tool is about the moderation result.

22. The method of claim 1, further comprising applying a strictness value on the moderation request.

23. The method of claim 1, wherein the moderator tool differentiates the acceptable contents and the unacceptable contents by defining a boundary in the feature space that separates the labeled acceptable contents and unacceptable contents.

24. The method of claim 1, wherein the moderator tool, in executing the first algorithm and the second algorithm, performs at least one of: language detection, determining sums, determining means, or determining distribution parameters, weighting using tf.idf, weighting using entropy, or normalizing document vectors.

25. A moderation system for moderating data contents by a computer-executable method, comprising:
a) a moderator tool executing algorithms for:
executing a first algorithm that identifies features that exist in training data provided in the form of a set of data contents labelled as acceptable and unacceptable contents and for extracting them, ending up with a feature space,
executing a second algorithm in the feature space for:
choosing the features to be used in a moderation model to be created and defining weighting of data features, the choosing and defining based on the data contents labelled as acceptable or unacceptable contents, and
creating the moderation model by training parameters of a machine learning model based on the weighted data features,
moderation of data contents received from one or more client devices by said moderation model, and
producing a moderating result for the data contents by indicating whether the new data content is acceptable or unacceptable,
b) one or more client devices for sending training data and data contents to the moderator tool to be moderated, and
c) an interface for interaction between the one or more client devices and the moderator tool,
wherein the moderator tool performs language detection.

26. The moderation system of claim 25, wherein said moderation model is specific for a given type of training data, whereby the moderator tool serves each client device individually by using a specific moderation model.

27. A non-transitory computer-readable medium storing executable instructions for moderating data contents, the executable instructions implementing one or more algorithms of a moderator tool for:
   analyzing training data comprising a set of data contents labeled to be acceptable or unacceptable contents,
   executing a first algorithm that identifies features that exist in the training data and extracting them for ending up with a feature space,
   executing a second algorithm in the feature space for:
      choosing the features to be used in a moderation model to be created and defining weighting of data features, the choosing and defining based on the data contents labeled as acceptable or unacceptable contents and differentiate the acceptable contents and the unacceptable contents by defining a boundary in the feature space that separates the labeled acceptable contents and unacceptable contents, and
      creating the moderation model by training parameters of a machine learning model based on the weighted data features,
   using the moderation model for moderation of data contents by identifying data features in the data content, and
   producing a moderating result of the data content,
   wherein the moderator tool performs language detection.

* * * * *